Nov. 6, 1951  J. E. ANDERSON ET AL  2,573,783
PROPELLER PITCH CHANGE MOTOR
Original Filed Feb. 4, 1943  6 Sheets-Sheet 1

INVENTORS
John E. Anderson
Arthur N. Allen, Jr.
BY
Harris G. Luther
ATTORNEY

Nov. 6, 1951 — J. E. ANDERSON ET AL — 2,573,783
PROPELLER PITCH CHANGE MOTOR
Original Filed Feb. 4, 1943 — 6 Sheets-Sheet 2
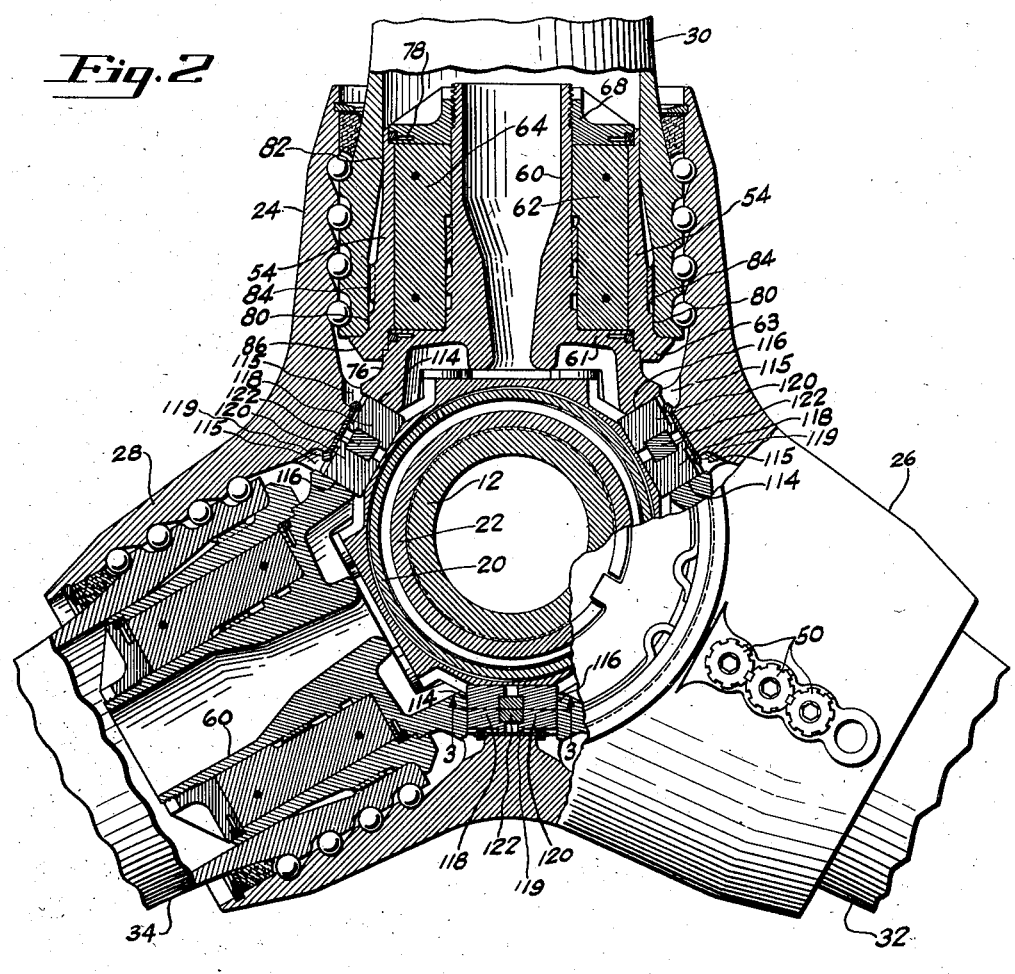
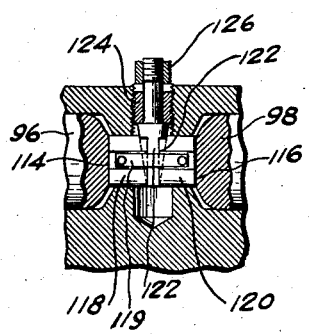
INVENTORS
John E. Anderson
Arthur N. Allen, Jr.
BY Harris G. Luther
ATTORNEY Nov. 6, 1951　　　J. E. ANDERSON ET AL　　　2,573,783
PROPELLER PITCH CHANGE MOTOR Original Filed Feb. 4, 1943　　　　　　　　　6 Sheets-Sheet 5

INVENTORS
John E. Anderson
Arthur N. Allen, Jr.
BY
Harris G. Luther
ATTORNEY

Nov. 6, 1951 J. E. ANDERSON ET AL 2,573,783
PROPELLER PITCH CHANGE MOTOR
Original Filed Feb. 4, 1943 6 Sheets-Sheet 6

INVENTORS
John E. Anderson
Arthur N. Allen, Jr.
BY Harris G. Luther
ATTORNEY

Patented Nov. 6, 1951

2,573,783

UNITED STATES PATENT OFFICE 2,573,783

PROPELLER PITCH CHANGE MOTOR

John E. Anderson, Portland, and Arthur N. Allen, Jr., East Windsor Hill, Conn., assignors to United Aircraft Corporation, East Hartford, Conn., a corporation of Delaware Original application February 4, 1943, Serial No. 474,638, now Patent No. 2,533,415, dated December 12, 1950. Divided and this application October 9, 1945, Serial No. 621,224

9 Claims. (Cl. 170—160.33)

This application is a division of United States application Serial No. 474,638, filed February 4, 1943, by John E. Anderson and Arthur N. Allen, Jr., for Propellers, now Patent No. 2,533,415, issued December 12, 1950.

This invention relates to improvements in hydro-controllable aeronautical propellers and has particular reference to an improved hydraulic motor for changing the propeller pitch.

An object of the invention resides in the provision of a motor so small in size that one may be placed in the base end of each blade, the motor being capable of utilizing hydraulic fluid at extremely high pressures.

A further object resides in the provision of improved fluidtight seals within the motor for preventing leakage of the extremely high pressure fluid, and capable of withstanding the severe service to which they are subjected.

A still further object resides in the provision of motors of the character indicated which can be completely assembled and tested outside of the propeller and subsequently incorporated as units in the propeller combination.

Other objects and advantages will be more particularly pointed out hereinafter or will become apparent as the description proceeds.

In the accompanying drawings, in which like reference numerals are utilized to designate similar parts throughout, there is illustrated a suitable mechanical embodiment for the purpose of disclosing the invention.

Fig. 2 is a transverse sectional view on the line 2—2 of Fig. 1.

Fig. 3 is a sectional view of a fragmentary portion of the propeller taken on the line 3—3 of Fig. 2 and showing in detail the wedge construction for preloading the blade retaining bearings.

Figure 1:
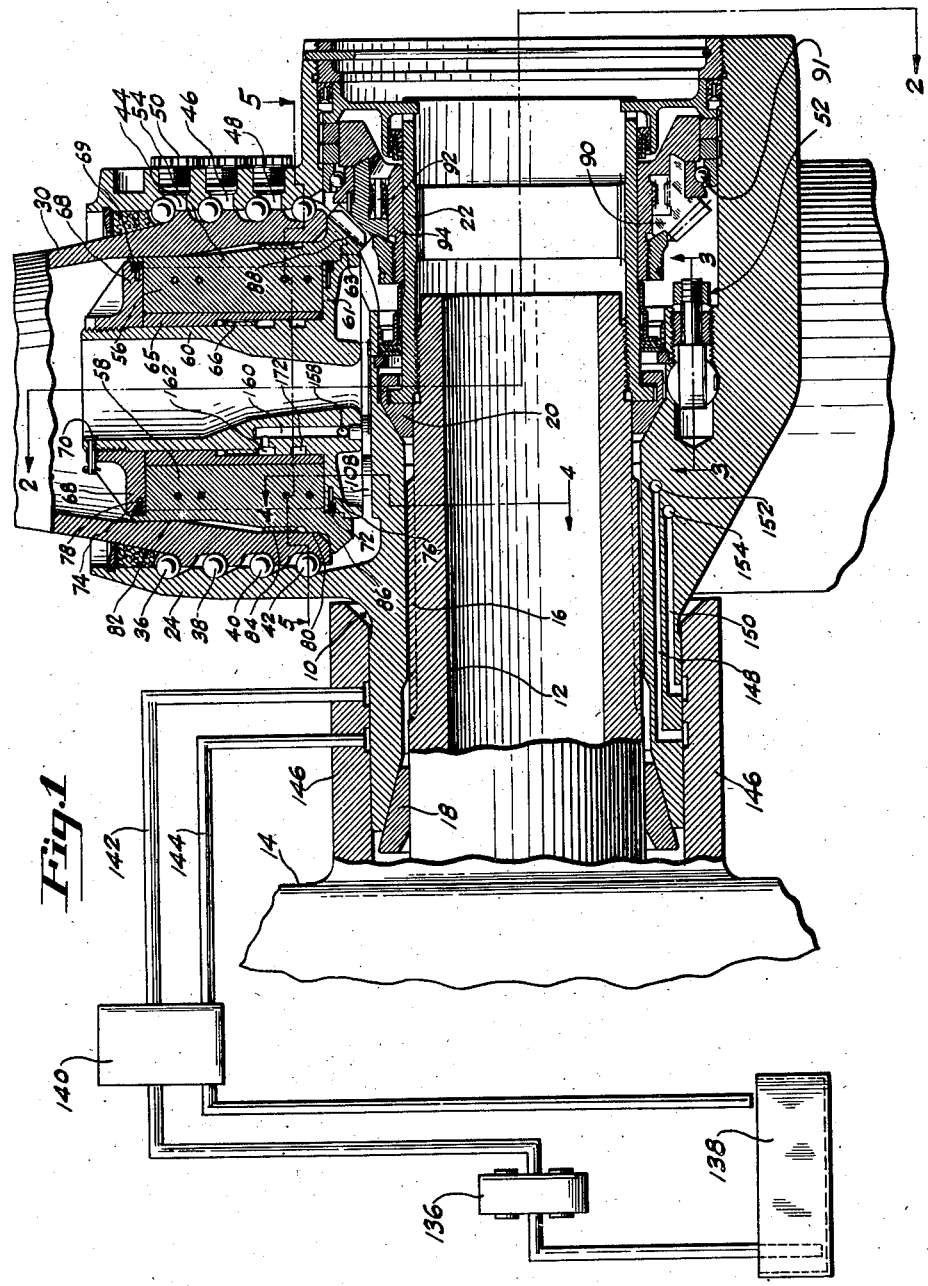
Fig. 1 is a sectional view through a propeller hub, showing a pitch changing motor constructed according to the invention, and diagrammatically illustrating a hydraulic system for operating the motors.

The propeller has a hub 10 mounted on shaft 12 of the engine 14. The hub is splined to shaft 12 as indicated at 16, and is held in operative position on the shaft by cones 18 and 20, and nut 22 threaded onto shaft 12. The hub has blade-retaining sockets 24, 26 and 28 (Fig. 2) which receive blades 30, 32 and 34. The blades are retained in the sockets by stacked thrust ball bearings, as indicated at 36, 38, 40 and 42, in circumferential seats in the interior of each blade socket and on the exterior of each blade shank. It will be noted from Figs. 1 and 2 that the grooves in the blades are somewhat elongated in cross-section, the arrangement being such that if the blades are moved radially inwardly from their operative positions the bearing balls may be inserted through holes 44, 46 and 48 into the grooves and thereafter the blades may be restored to their operative positions as in Fig. 1. After the balls have been inserted the holes are closed by screw plugs 50 to prevent entry of dirt and to retain lubricant. No holes have been provided for the bottom row of balls 42 since the balls of this row may be inserted from the inside of the hub. The movement of the blades from the inward position in which the balls are inserted to the outward position in which they are retained in operative position is controlled by a wedge arrangement indicated at 52 in Fig. 1 and particularly illustrated in Fig. 3, the detailed construction and operation of which will later appear.

Each servo-motor comprises an outer rotatable sleeve-like member 54 (Fig. 5) and an inner member 65, the outer member 54 having two diametrically opposed inwardly projecting vanes 56 and 58 and the inner member 65 having two diametrically opposed outwardly projecting abutments 62 and 64 of the same length as 56 and 58, the difference between the external diameter of the inner member and the inner diameter of the outward member being the depth of the vanes and abutments. The outer rotatable sleeve-like member 54 is provided with means such as splines 84 to prevent motion relative to the blade 30, and the inner member 65 has similar means 66 (Fig. 1) for preventing motion relative to stationary member 60.

Stationary member 60 is provided with an outwardly extended radial flange 61 (Fig. 1). The outer member 54 has a shoulder 63 forming a recess extending somewhat beyond the depth of vanes 56 and 58 and in line with the ends of the vanes which surround flange 61. A cap 68 is screwed on to the outer end of member 60 until it bears against the end of abutments 56, 58, 62 and 64, entering a circular recess 69 countersunk in the outer end of member 54 and extending somewhat beyond the depth of the vanes 56 and 58 in line with the outer ends of these vanes. After cap 68 has been screwed to position a retaining pin 70 is inserted to lock it. In this position, close contact is made between the ends of member 65 and 54 thus closing the ends of the cavities formed by the assembled position of these members. Flange 61 and cap 68 extend radially somewhat beyond the depth of vanes 56 and 58 to provide a fluid seal between abutments 62 and 64 and the wall portion of outer member 54. Flange 61 is provided in its periphery with a ring groove in which is a sealing ring 72. A similar ring 74 is provided around cap 68. The ring grooves are extended in depth, in reduced form, beyond the inner circumference of the rings, as indicated at 76 and 78 (Figs. 1 and 2) to provide relatively thin annular fin-like flange portions of each member 61 and 68 in contact with the corresponding ends of member 54 and disposed between the ends of the outer member 54 and the corresponding sealing rings 72 and 74. The purpose of these flexible flange portions is to maintain constant contact with the ends of the vanes. As the sealing rings prevent external leakage of the assembly at this point, any fluid passing the shoulders into the recesses creates sufficient pressure for proper seating of the fin-like flange portions on the end of the vanes.

After the elements 60, 65, 54 and 68 have been assembled as indicated above and tested, the motor is installed as a unit in the hollow end of the blade. Preferably the outside dimensions of the motor and the inside dimensions of the blade are such as to provide a push fit between the outer member 54 and the blade to secure the motor firmly in the blade ends and insure its remaining in proper alignment with the blades. In the embodiment illustrated the outer surface of the motor contacts the inner surface of the blade at two spaced locations 80 and 82 and the blade torque is transmitted from the outer member 54 of the motor to the blade through a serrated or splined connection 84 (Fig. 2).

The bottom portion of outer member 54 is provided with an outwardly projecting annular flange 86 which underlies the root end of blade 30 and has, on a portion of its circumference, a gear sector 88 the teeth of which mesh with the teeth of a blade synchronizing gear 90 rotatably mounted in a ball bearing 91 in hub member 10. The cooperation of the beveled gear sector 88 of each motor and the blade bevel gear 90 insures simultaneous and similar pitch changes of all blades.

Slight adjustments in pitch between the several blades to obtain a condition of aerodynamic balance may be accomplished manually by utilizing the adjustable feature, indicated at 92, of the gear 90 (Fig. 1). Gear 90 has three separate segments each one of which meshes with one of the motor gear segments, the segments of the gear 90 being secured to a continuous inner or hub portion 94 thereof by a spline connection arranged to provide a vernier adjustment between the separate sectors and the continuous hub portion. This adjustable feature is particularly illustrated and described in United States application Serial No. 361,565, filed October 17, 1940, by John E. Anderson, now Patent No. 2,396,630 for Blade Adjusting Means, and assigned to the assignee of this application.

Figure 4:
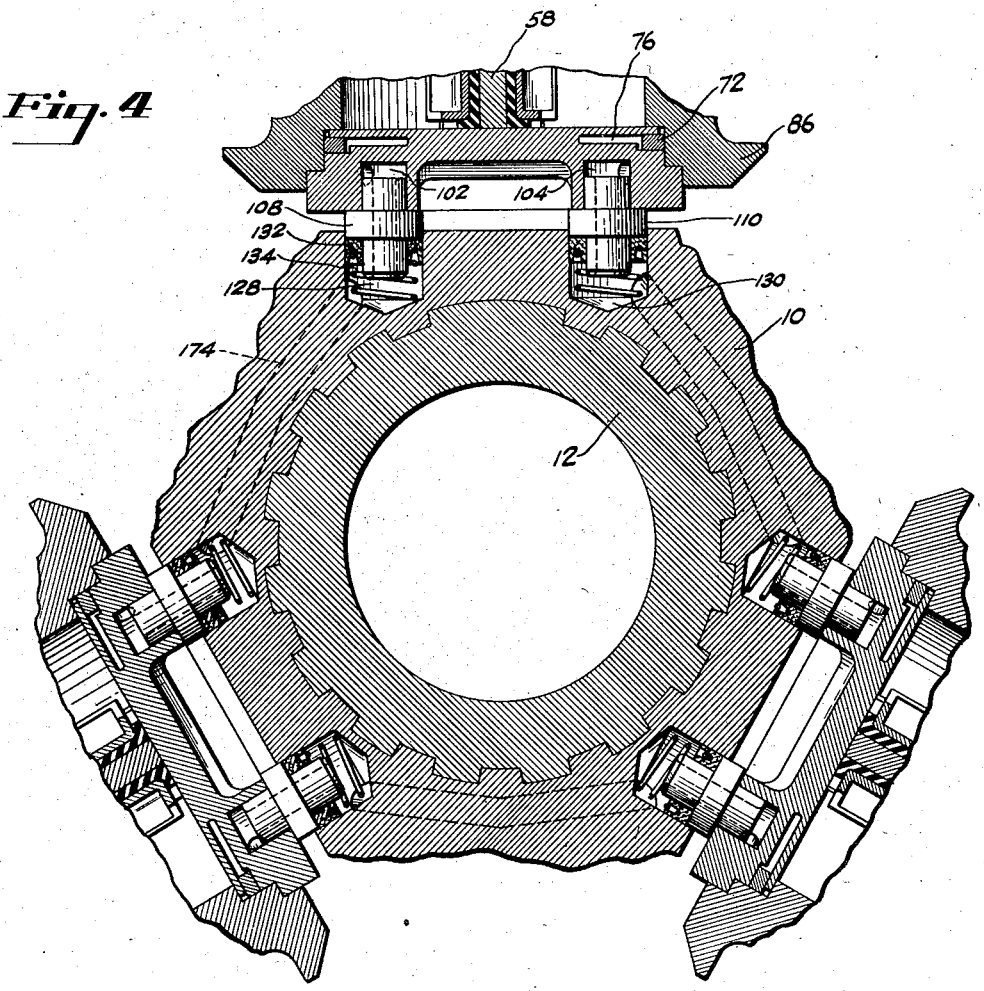
Fig. 4 is a transverse sectional view on the line 4—4 of Fig. 1 particularly illustrating some of the connections between the fluid motors and the hub-included portion of the hydraulic system.
Figure 6:
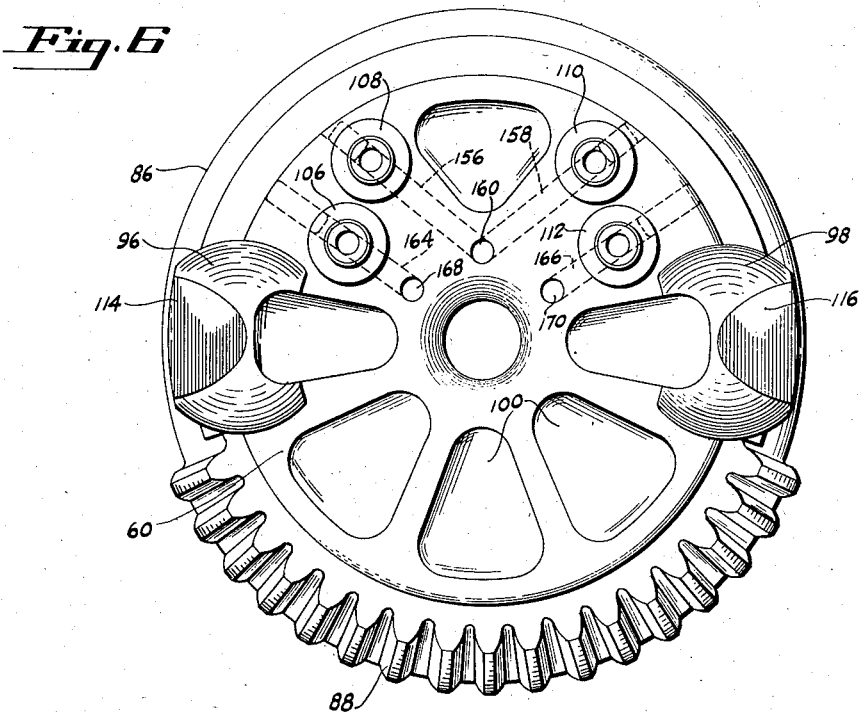
Fig. 6 is a bottom view of a propeller blade with a hydraulic motor constructed according to the invention assembled therein.

The bottom of inner member 60 is provided with a pair of diametrically opposed partly cylindrical lugs 96 and 98 (Fig. 6), and is also provided with four circular sockets, two of which are indicated at 102 and 104 in Fig. 4, which receive the tubular flanged connectors 106, 108, 110 and 112. As is shown in Fig. 4 each of these connectors is provided intermediate its length with an outwardly extending flange, and has reduced diameter end portions received in corresponding wells or recesses in the bottom of the inner motor member 60 and in the hub member 10. Depressions 100 reduce weight of member 60.

When the blade and motor are installed in the propeller hub the blade and motor combination is brought to a position in which lugs 96 and 98 have their center line in a plane perpendicular to the axis of shaft 12. In this position the lugs will fit into cylindrical recesses 115 provided in hub 10, and the corresponding lugs of adjacent blades will be brought into close proximity between each pair of adjacent sockets. The surface of each lug facing an adjacent lug is flattened, as indicated at 114 and 116 (Figs. 2 and 6) and these flats bear against the ends of slidable blocks shown at 118 and 120 in Figs. 2 and 3. For convenience in assembly a strap 119 (Figs. 2 and 3) is placed, as shown, in grooves in the sides of each pair of blocks 118, 120. Between blocks 118 and 120 there is a wedge 122 adjustable by means of a nut 124 threaded into the hub and locked in adjusted position by nut 126 on the stem of the wedge member. When lugs 96 and 98 are positioned as indicated above, the ends of connectors 106, 108, 110 and 112 (Fig. 6) projecting from the bottom of the member 60 are received in corresponding sockets provided in the portion of the hub member covered by the bottom end of the motor member 60, two of these sockets being indicated at 128 and 130 in Fig. 4. As is also indicated in Fig. 4, the reduced end of each connector is surrounded by a flexible packing 132 expanded in position between the connector and the wall of the socket. This packing is held in relation to the connector by the compression spring 134. Preferably the sockets in the hub member are of sufficient size to just receive the flanges on the connector members.

When the blade-motor combination is inserted in its blade socket, wedge 122 is retracted, permitting blocks 118 and 120 to move toward each other and permitting the blade and motor combination to move inwardly beyond its normal operating position in the blade socket. When this occurs connectors 106, 108, 110 and 112 will be forced into the corresponding sockets in the hub member, the flanges of the connectors compressing springs 134. With the blade and motor combination in this position the bearing balls are inserted in the corresponding race grooves, after which wedge members 122 are forced in by nut 124, forcing the blade-motor combinations radially outwardly until each blade bearing is given the desired preloading to maintain the blade in firm association with its corresponding socket. When this occurs, springs 134 force the packings and connectors outwardly and maintain the fluid seals. In addition to serving as abutments for preloading the blade retaining bearings, lugs 96 and 98 also serve to prevent rotation of the inner portion of the motor and thereby resist the torque reaction during the pitch changing movements of the motor.

Fluid may be supplied by a pump 136 as diagrammatically illustrated in Fig. 1, and the connection of the pump outlet with either side of the motor and the connection of the opposite side of the motor with the sump 138 may be controlled by a speed responsive device such as a governor indicated at 140. Two fluid lines 142 and 144, which may be alternatively pressure or drain lines depending upon the direction of pitch change required, are led through a suitable transfer bearing 146 (Fig. 1) to a pair of channels 148 and 150 connected with manifolds 152 and 154.

While a suitable hydraulic system for supplying pressure fluid to and draining exhaust fluid from the motors has been diagrammatically illustrated, it is to be understood that the invention is in no way limited to any particular system but that various other hydraulic systems may be used such, for example, as that particularly illustrated and described in co-pending United States application Serial No. 77,644, filed February 21, 1949, by Donald W. Perin and Nelson R. Richmond, for Propeller Control Means, and assigned to the assignee of this application, which is a continuation of application Serial No. 664,640, filed April 24, 1946, now abandoned, which in turn is a continuation of application Serial No. 422,252 filed December 9, 1941, also abandoned, in which the source of fluid under pressure is a pump carried by and rotatable with the propeller hub and in which a fluid distribution valve is disposed in the propeller hub and hydraulically interposed between this pump and the pitch changing motors.

As explained above, and as particularly illustrated in Fig. 6, there are four connectors associated with each pitch changing motor, two being connected with one side of the motor and the other two with the opposite side of the motor. For example, connectors 108 and 110 are connected with one side of the motor through channels 156, 158 (Figs. 1 and 6) while connectors 106 and 112 are connected with the opposite side of the motor through the channels 164, 166, 168, 170 and 172. Thus for each motor there is one pair of connectors associated with one side of the motor and another pair associated with the opposite side. One of the manifolds 152 or 154 is connected with all passages in the hub member associated with one pair of connectors and the other manifold is connected with the other pairs of connectors. By referring to Figs. 4 and 6 it may be seen that the passages include channels, as indicated at 174, connecting adjacent hub member sockets in the same plane at right angles to the axis of rotation of the hub, and fluid channels in the inner motor member connecting the sockets of each pair together and with the motor chambers. It will be noticed that some fluid channels, such as 162, 172 are annular grooves cut in the outer surface of inner member 60 within sleeve 54.

Figure 5:
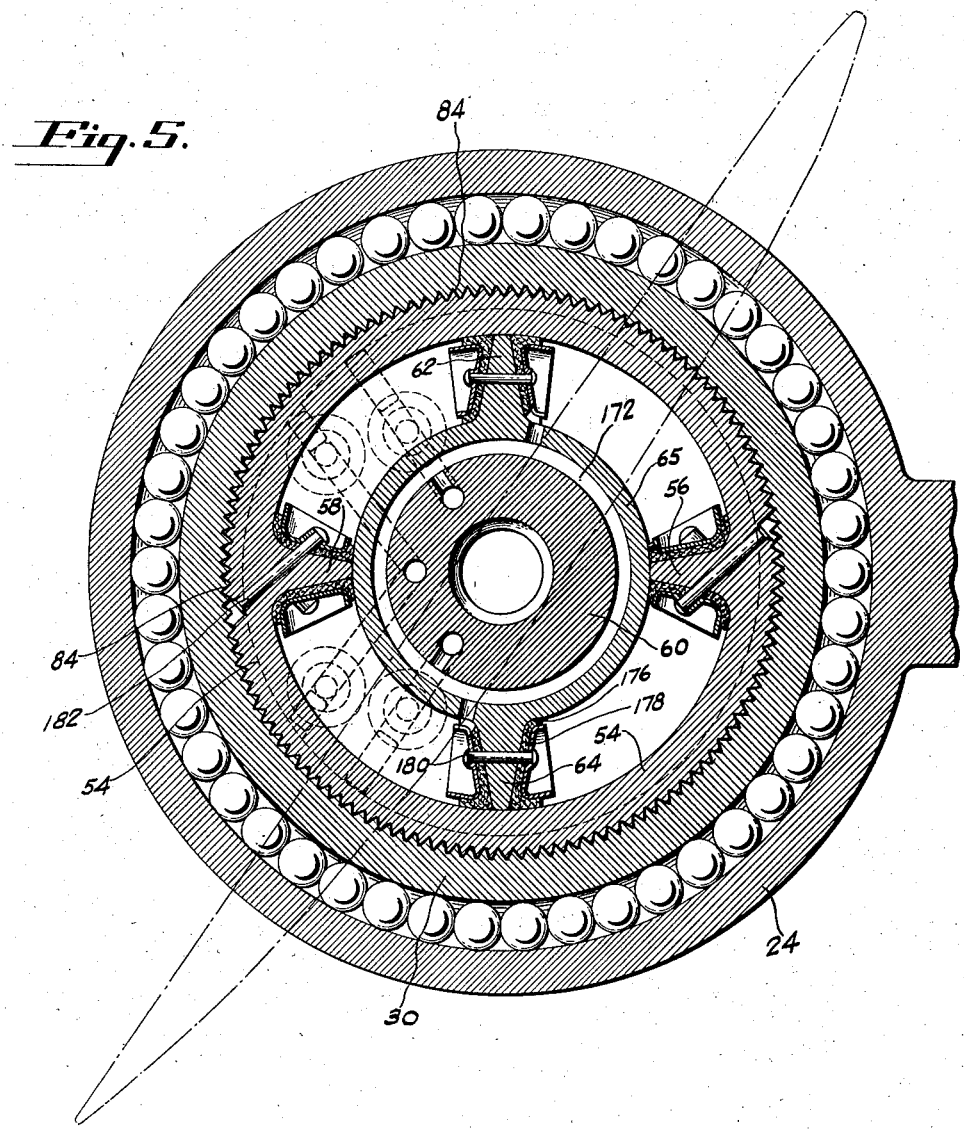
Fig. 5 is a transverse sectional view on the line 5—5 of Fig. 1 showing details of one of the hydraulic motors.

In order to prevent leakage of fluid past the various motor vanes and abutments, their surfaces are covered by flexible packing formed of resilient material indicated at 176 in Fig. 5, and each packing member is held in place by a generally cup shaped washer member as indicated at 178. The washer members for abutments 62 and 64 are held in place by rivets 180 while each washer member for vanes 56 and 58 is held in place by a rivet 182 extending through member 54.

Figure 7:
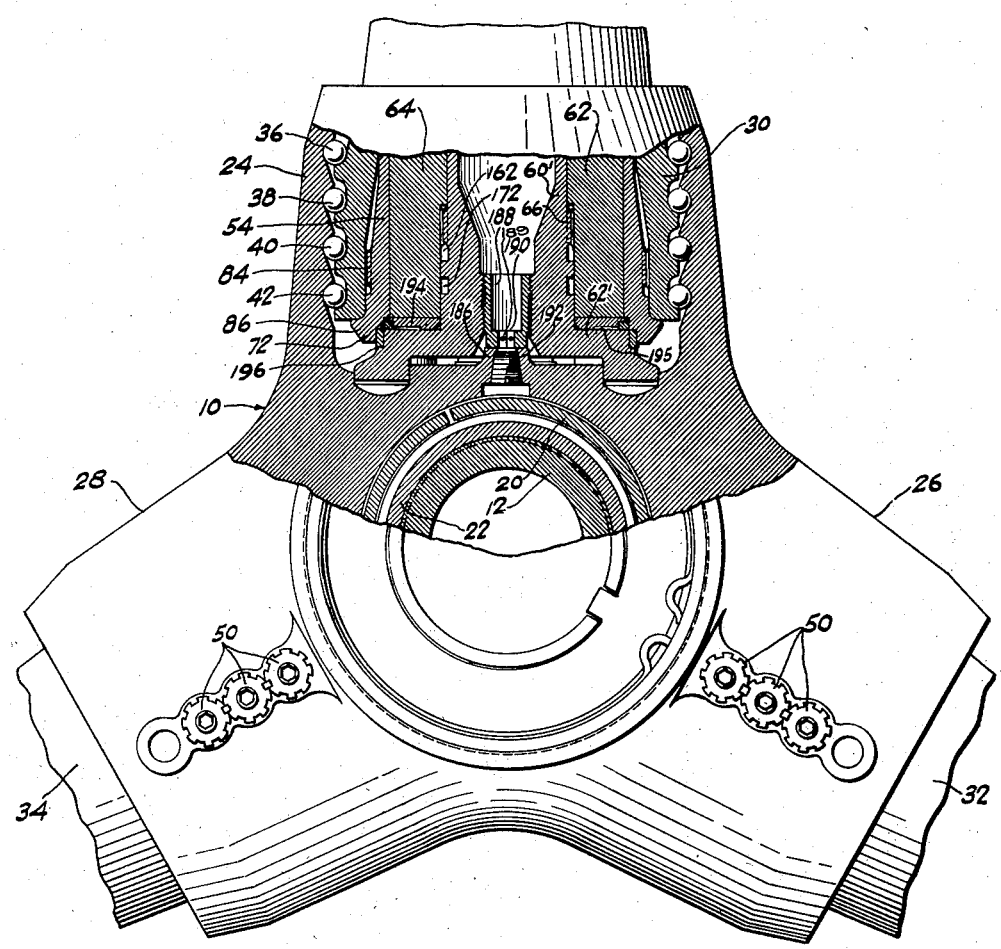
Fig. 7 is a front elevational view, similar to Fig. 2, of the center portion of a propeller constructed according to the invention, a portion being broken away and shown in section, to illustrate a somewhat modified form of motor and blade retention means.

In the modified form of the device shown in Fig. 7 the wedge members particularly indicated at 118, 120 and 122 in Figs. 2 and 3 are omitted and the hub member 10 within each blade socket 24 is provided with an internally screw threaded boss 186 coaxial with the blade socket. The inner member 60' of the vane motor is internally threaded to receive a hollow plug 168 having a lower end surface adapted to contact the outer surface of the boss 186, and provided in its lower end with a wrench socket 190.

The blade retention bearings may be preloaded by manipulation of the plug 188 in the following manner.

Before a blade is inserted in a blade socket the plug member 188 is inserted in the end of the center post 60' and screwed upwardly, as viewed in Figure 7, to a position which will permit the base end of the blade to move into the socket to the maximum extent, at which position of the blade the balls may be inserted as previously described. After the balls have all been inserted, a wrench is inserted through boss 186 into socket 190 in plug 188 and this plug is screwed down, as viewed in Figure 7, to force the blade upwardly in the blade socket, the incidental reaction being taken by pressure of the end of plug 188 on boss 186. Holes 189 are provided in the plug 188 to receive a lock pin (not shown) for preventing accidental movement of the plug after it has once been adjusted. After plug member 188 has been moved a sufficient distance to apply the proper preloading to the blade bearings a plug 192 is screwed into the hole in boss 186 to prevent passage of lubricating fluid to the interior of the shaft-surrounding portion of hub member 10.

In this modified form of the invention it is to be noted that instead of the integral fin-like flange portions particularly illustrated in Figs. 1 and 4, separate washers, one of which is indicated at 194, are used to seal the ends of the vane motor. Any fluid passing the shoulders into the recess 195 creates sufficient pressure for proper seating of the separate ring on the end of the vanes. The seal ring 72 is retained in this modification and an additional endless thrust ring 196 is added providing a centering action for the internal parts and also having the function of retaining the seal ring 72 in position for assembly. After rings 194 and 72 are assembled in position ring 196 is slipped over ring 72 and left in position to compress this ring into the annular groove provided for it in the periphery of washer 194. Then as the outer member 54 of the motor is brought to assembled position ring 196 is moved down to the position illustrated in Fig. 7 and ring 72 is held in operative position by the circumferential lower end of member 54, ring 196 being forced down into a peripheral recess provided for it in the lower flange portion of the inner member 60' and resting against an annular shoulder at the bottom of this recess.

The above sealing construction including sealing washer or plate 194 disclosed in this application is claimed in a continuation application, Patent No. 2,550,180, issued April 24, 1951, of Arthur N. Allen, Jr.

It will be appreciated from the above that the fluid motor is complete in itself and may be assembled and tested as a unit entirely independently of the hub-blade assembly.

While a suitable mechanical embodiment has been hereinabove described and illustrated in the accompanying drawings for the purpose of disclosing the invention, it is to be understood that the invention is not limited to the particular embodiment so illustrated and described, but that such changes in the size, shape and arrangement of the various parts may be resorted to as come within the scope of the subjoined claims.

Having now described the invention so that others skilled in the art may clearly understand the same, what it is desired to secure by Letters Patent is as follows:

1. In combination with a controllable-pitch propeller having a plurality of blades and a blade retaining hub, individual motors for rotating said blades in pitch changing directions each comprising a hollow outer portion fixed in the hollow root end of a blade, and an inner portion separate from said hub within said outer portion, said inner and outer portions being rotatable relatively to each other, recesses in said propeller hub, and a pair of lugs on each inner portion seated in said recesses in said propeller hub to restrain said inner portion against rotation relative to said hub, corresponding recesses in said inner motor portion and said hub member constituting a pair of recesses, and a tubular connector slidably received in each pair to provide flexible fluid connections between said hub member and said motor.

2. The arrangement as set forth in claim 1 in which each of said connectors is provided intermediate its length with an external flange, one of each pair of corresponding recesses being of proper size to slidably receive said flange, and a packing member surrounding each connector within the flange-receiving recess.

3. The arrangement as set forth in claim 1 in which each of said connectors is provided intermediate its length with an external flange and in which the connector receiving recesses in said hub member are sufficient in size to receive said flanges, a packing member surrounding each connector within its recess, and a compression spring holding each packing member in position against its corresponding flange and urging the corresponding plug out of the recess.

4. In combination with a controllable-pitch propeller having a plurality of blades and a blade retaining hub, individual motors for rotating said blades in pitch changing directions, each motor comprising a hollow outer portion fixed in the hollow root end of a blade, and an inner portion separate from said hub within said outer portion, said inner and outer portions being rotatable relatively to each other, recesses in said propeller hub, a pair of lugs on each inner portion seated in said recesses in said propeller hub to restrain said inner portion against rotation relative to said hub, corresponding recesses in said inner motor portion and said hub member constituting a pair of recesses, a tubular connector slidably received in each pair to provide fluid connections between said hub and said motor, and continuous fluid passages connecting all of said motors and constituted in part by said connectors.

5. A fluid motor comprising an inner member provided with radially extending abutments, an outer member surrounding said inner member and provided internally with radially extending vanes disposed between the abutments on said inner member, flanges on said inner member at the ends of said abutments and extending beyond said vanes, said flanges being received in circular recesses in the ends of said outer member, one of said flanges being detachable from said inner member.

6. A fluid motor comprising an inner member provided with radially extending abutments, an outer member surrounding said inner member and provided internally with radially extending vanes disposed between the abutments on said inner member, flanges on said inner member at the ends of said vanes extending beyond said vanes and received in circular recesses in the ends of said outer member, one of said flanges being detachable from said inner member, ring grooves in said flanges, and sealing rings in said grooves, said grooves being extended inwardly in reduced section to provide flexible fins integral with said flanges and in contact with the bottoms of the recesses in said outer member.

7. A fluid motor comprising an inner member provided with radially extending abutments, an outer member surrounding said inner member and provided internally with radially extending vanes disposed between the abutments on said inner member, flanges on said inner member at the ends of said vanes, said flanges extending beyond said vanes and being received in circular recesses in the ends of said outer member, said inner member comprising a core member provided with grooves in the surface thereof constituting fluid channels, and a tubular abutment carrying member fitted over said core member and covering said grooves.

8. In a controllable pitch propeller having a plurality of blades retained in blade receiving sockets in a propeller hub, individual motors for rotating said blades in pitch changing directions each comprising a hollow outer portion fixed in the hollow root end of a blade and an inner portion separate from said hub within said outer portion, said inner and outer portions being relatively rotatable, recesses in said propeller hub, and a pair of lugs on each inner portion extending longitudinally of said blade and seated in said recesses in said propeller hub to restrain said inner portion against rotation relative to said hub, corresponding recesses in said inner motor portion and said hub member, and a plurality of tubular connectors slidably received in said corresponding recesses extending longitudinally of said blade to provide fluid connections between said hub member and said motor, said lugs, said recesses and said corresponding recesses all extending substantially parallel to the axis of the blade receiving socket so that the lugs may be inserted into their recesses and the tubular connectors may be inserted in their corresponding recesses by insertion of the blade in its socket.

9. A pitch changing fluid motor for rotating the blades of a controllable pitch propeller in pitch changing directions, comprising a hollow outer portion adapted to be attached to the hollow root end of a propeller blade, an inner portion within said outer portion, said inner and outer portions being rotatable relative to each other by fluid under pressure, a socket for receiving said motor, recesses in said socket, and a pair of lugs on each inner portion seated in said recesses to restrain said inner portion against rotation, corresponding recesses in said inner motor portion and said socket, and a plurality of tubular connectors slidably received in said corresponding recesses to provide flexible fluid connections between said hub member and said motor.

JOHN E. ANDERSON.
ARTHUR N. ALLEN, Jr.

REFERENCES CITED

The following references are of record in the file of this patent:

UNITED STATES PATENTS

| Number | Name | Date |
|---|---|---|
| 853,999 | Schmid | May 21, 1907 |
| 2,013,647 | Bace | Sept. 10, 1935 |
| 2,307,101 | Blanchard et al. | Jan. 5, 1943 |

FOREIGN PATENTS

| Number | Country | Date |
|---|---|---|
| 476,972 | Great Britain | Dec. 20, 1937 |
| 539,303 | Great Britain | Sept. 4, 1941 |
| 857,521 | France | Apr. 22, 1940 |
| 346,563 | Germany | Jan. 4, 1922 |
| 147,228 | Switzerland | Aug. 17, 1931 |